(12) United States Patent
Priepke et al.

(10) Patent No.: US 8,109,531 B2
(45) Date of Patent: Feb. 7, 2012

(54) PUSH-STEER IMPLEMENT HITCH (75) Inventors: Edward H. Priepke, Lancaster, PA (US); David M. DeChristopher, Akron, PA (US); J. Levi Taylor, Scottsville, VA (US)

(73) Assignee: CNH America LLC ( * ) Notice: Subject to any disclaimer, the term of this patent is extended or adjusted under 35 U.S.C. 154(b) by 771 days.

(21) Appl. No.: 11/687,659

(22) Filed: Mar. 18, 2007

(65) Prior Publication Data
US 2008/0223591 A1  Sep. 18, 2008

(51) Int. Cl.
*B62D 49/04* (2006.01)
*E02F 3/65* (2006.01)

(52) U.S. Cl. .......................... 280/481; 37/417

(58) Field of Classification Search .............. 172/279, 172/799.5; 280/481; 37/417
See application file for complete search history.

(56) References Cited

U.S. PATENT DOCUMENTS

| | | | | |
|---|---|---|---|---|
| 1,429,734 A | * | 9/1922 | Hoffman | 280/442 |
| 2,099,902 A | * | 11/1937 | Moyer et al. | 56/7 |
| 2,202,310 A | | 5/1940 | Cope | |
| 2,322,295 A | | 6/1943 | Hill | |
| 2,646,290 A | * | 7/1953 | Cox | 280/443 |
| 2,726,097 A | * | 12/1955 | Darrough | 280/455.1 |
| 2,980,443 A | | 4/1961 | Fina, Jr. | |
| 3,010,230 A | * | 11/1961 | Zubko | 37/270 |
| 3,172,480 A | * | 3/1965 | Bemis | 172/7 |
| 3,653,687 A | * | 4/1972 | Forsyth et al. | 280/476.1 |
| 3,669,194 A | | 6/1972 | Zurek | |
| 3,742,685 A | | 7/1973 | Lian et al. | |
| 3,955,831 A | * | 5/1976 | Whitchurch | 280/423.1 |
| 4,598,926 A | * | 7/1986 | Gallatin | 280/459 |
| 4,761,016 A | | 8/1988 | Groud | |
| 4,926,619 A | | 5/1990 | Ungruh et al. | |
| 5,146,733 A | | 9/1992 | Klaeger | |
| 5,299,821 A | | 4/1994 | Hurlburt | |
| 5,794,424 A | | 8/1998 | Ermacora et al. | |
| 6,343,660 B1 | | 2/2002 | Mutsaers | |
| 2004/0079541 A1 | * | 4/2004 | Marquardt | 172/817 |
| 2006/0191250 A1 | | 8/2006 | Neuerburg et al. | |

FOREIGN PATENT DOCUMENTS

DE 3607691  10/1986
GB 2079126 A  1/1982

* cited by examiner

*Primary Examiner* — Joanne Silbermann
*Assistant Examiner* — Daniel Yeagley
(74) *Attorney, Agent, or Firm* — Patrick Sheldrake; Sue C. Watson (57) ABSTRACT

A system for push-steering an implement includes a pair of links, each link connecting the implement to a front portion of a motorized vehicle. Each link of the pair of connected links between the motorized vehicle and the implement is non parallel to each other. In response to the motorized vehicle traveling at a first predetermined steering angle, a traction element developed between at least two wheels of the implement and the driving surface rotatably urges one link toward a predetermined offset angle in a rotational direction opposite of the first predetermined steering angle. The pair of links simultaneously rotatably urges the implement to be steered toward a second predetermined steering angle in the same rotational direction as the first predetermined steering angle. The predetermined offset angle and second predetermined steering angle define a substantially stable position in response to the first predetermined steering angle.

13 Claims, 6 Drawing Sheets

PUSH-STEER IMPLEMENT HITCH

FIELD OF THE INVENTION

The present invention relates generally to hitches between motorized vehicles and implements and, more particularly, to push-steer hitches between motorized vehicles and implements.

BACKGROUND OF THE INVENTION

In addition to their non-agricultural uses, tractors can be hitched to many agricultural implements to achieve a variety of desired applications, such as tillage, seeding, cutting or harvesting. Formerly, the implements were hitched to the tractors and pulled behind the tractor. However, in an effort to increase productivity, it can be desirable to push one implement and pull another to increase an operating width that is up to twice the transport width of the implements.

Making implements wider can also increase efficiency, but there are problems associated with transporting the tractor/implement combination between different fields. In response to this problem, some tillage and seeding implements can be hydraulically folded into narrow transport widths. For example, in a mower conditioner arrangement, one mower conditioner is carried on the front of the tractor and two mower conditioners are pulled behind the tractor that are hydraulically folded for transport. Alternately, bidirectional tractors have included one mower conditioner mounted at the front end and another mower conditioner having a pivot tongue is pulled behind the tractor. Each of these configurations requires a tractor having front three point hitches and a power take-off (PTO), or specially designed implement frames, or implements that themselves must be specially designed, thereby greatly increasing the costs of these components.

What is needed is an implement hitch that is compatible with tractors lacking specially configured fronts, i.e., three point hitches or PTO, the hitch requiring minimal change to existing implements.

SUMMARY OF THE INVENTION

The present invention relates to a system for push-steering an implement. The system includes a pair of links, each link connecting the implement to a front portion of a motorized vehicle having a first axis. The implement has a second axis and rotatably carries at least two spaced wheels, one of the links being pivotably connected to the implement. The remaining connections between the pair of links and the front portion of the motorized vehicle and the implement are rotatable connections. The pair of connected links between the motorized vehicle and the implement are non parallel to each other. In a home position, one link of the pair of links is disposed at a first angular position with respect to the first axis and the second axis is disposed at a second angular position with respect to the first axis. An extension of the pair of links defines an instantaneous center forward of the front portion and between the at least two wheels. In response to the motorized vehicle traveling at a first predetermined steering angle with respect to the first axis, causing the motorized vehicle and the implement to travel along a substantially arcuate path, a traction element is developed between the at least two wheels of the implement and the driving surface. The traction element rotatably urges the one link toward a predetermined offset angle from the first angular position in a rotational direction opposite of the first predetermined steering angle. The pair of links simultaneously rotatably urges the implement to be steered toward a second predetermined steering angle from the second angular position in the same rotational direction as the first predetermined steering angle. The predetermined offset angle and second predetermined steering angle define a substantially stable position in response to the first predetermined steering angle.

The present invention further relates to a system for push-steering an implement. The system includes a pair of links, each link connecting the implement to a front portion of a motorized vehicle having a first axis. The implement has a second axis and rotatably carries at least two spaced wheels, one of the links being pivotably connected to the implement. The remaining connections between the pair of links and the front portion of the motorized vehicle and the implement are rotatable connections. The pair of connected links between the motorized vehicle and the implement are non parallel to each other. A weight transfer system connects the one link of the pair of links to the front portion of the motorized vehicle. In a home position, one link of the pair of links is disposed at a first angular position with respect to the first axis and the second axis is disposed at a second angular position with respect to the first axis. An extension of the pair of links defines an instantaneous center forward of the front portion and between the at least two wheels. In response to the motorized vehicle traveling at a first predetermined steering angle with respect to the first axis, causing the motorized vehicle and the implement to travel along a substantially arcuate path, a traction element is developed between the at least two wheels of the implement and the driving surface. The traction element rotatably urges the one link toward a predetermined offset angle from the first angular position in a rotational direction opposite of the first predetermined steering angle. The pair of links simultaneously rotatably urges the implement to be steered toward a second predetermined steering angle from the second angular position in the same rotational direction as the first predetermined steering angle. The predetermined offset angle and second predetermined steering angle define a substantially stable position in response to the first predetermined steering angle.

The present invention yet further relates to a method for constructing a push-steering system for an implement. The method includes providing a pair of links and connecting each link to an implement. The method further includes connecting each link to a front portion of a motorized vehicle having a first axis, the pair of connected links between the motorized vehicle and the implement being non parallel to each other. The implement has a second axis and rotatably carries at least two spaced wheels, one of the links being pivotably connected to the implement. The remaining connections between the pair of links and the front portion of the motorized vehicle and the implement are rotatable connections. The pair of connected links between the motorized vehicle and the implement are non parallel to each other. In a home position, one link of the pair of links is disposed at a first angular position with respect to the first axis and the second axis is disposed at a second angular position with respect to the first axis. An extension of the pair of links defines an instantaneous center forward of the front portion and between the at least two wheels. In response to the motorized vehicle traveling at a first predetermined steering angle with respect to the first axis, causing the motorized vehicle and the implement to travel along a substantially arcuate path, a traction element is developed between the at least two wheels of the implement and the driving surface. The traction element rotatably urges the one link toward a predetermined offset angle from the first angular position in a rotational direction opposite of the first predetermined steering angle. The pair of links simultaneously rotatably urges the implement to be steered toward a second predetermined steering angle from the second angular position in the same rotational direction as the first predetermined steering angle. The predetermined offset angle and second predetermined steering angle define a substantially stable position in response to the first predetermined steering angle.

An advantage of an embodiment of the present invention is that operating efficiencies can be significantly improved.

A further advantage of an embodiment of the present invention is that the improved operating efficiencies are achieved while minimizing costs.

A still further advantage of an embodiment of the present invention is that the system reduces the number of new parts and associated inventories.

A yet further advantage of an embodiment of the present invention is that the system pushes the implement in a stable fashion without requiring special configuring of the front portion of a motorized vehicle.

A further advantage of an embodiment of the present invention is that the system utilizes the same implement frame as used with the pull type movement.

A still further advantage of an embodiment of the present invention is that the system incorporates steering stops to prevent unstable oversteering of the implement.

A yet further advantage of an embodiment of the present invention is that the system incorporates a weight transfer system from implement to motorized vehicle.

A still yet further advantage of the present invention is that the system utilizes spring centering to help stabilize steering speed.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

Wherever possible, the same reference numbers will be used throughout the drawings to refer to the same or like parts.

DETAILED DESCRIPTION OF THE INVENTION

Figure 1:
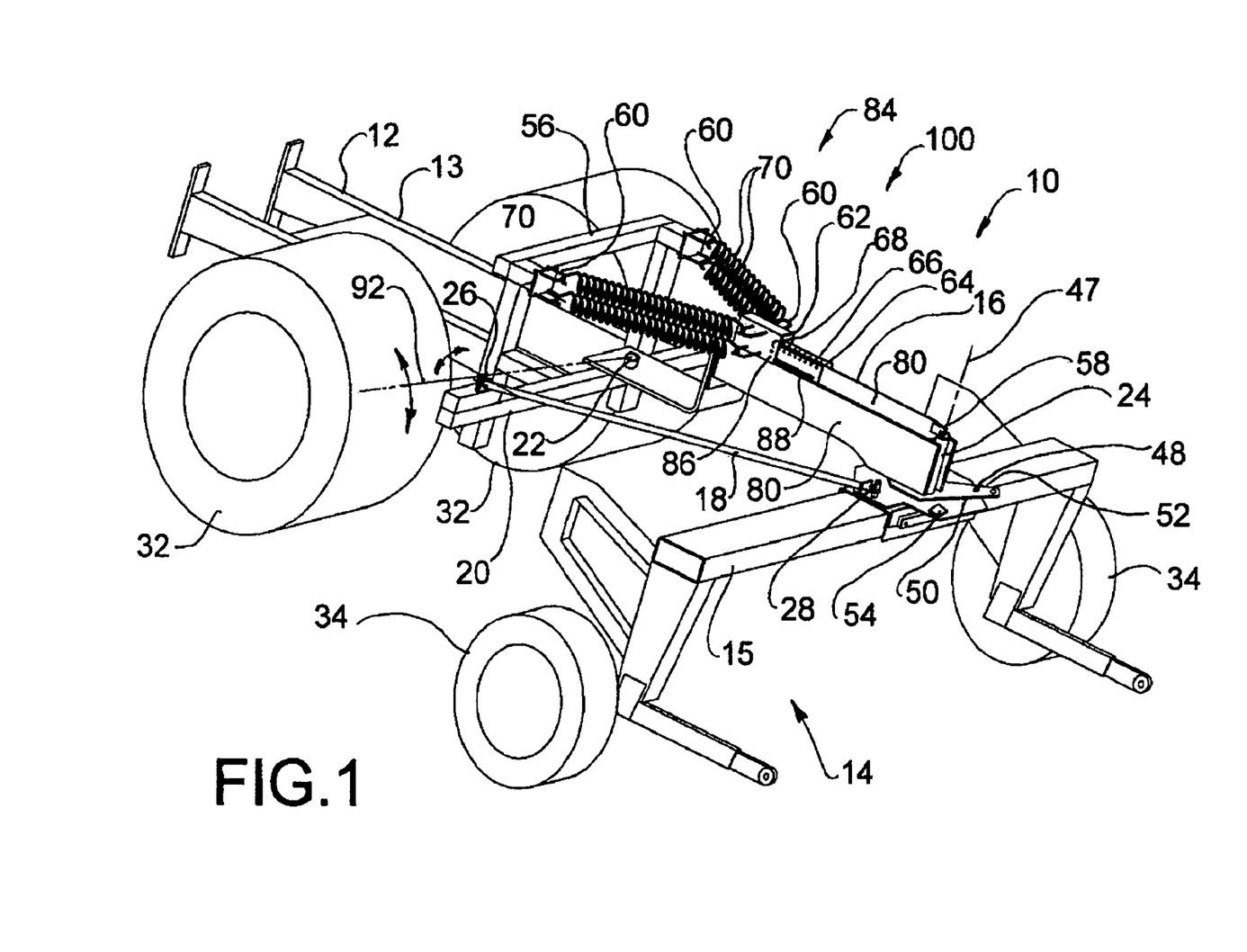
FIG. 1 is a top perspective view of a front portion of a motorized vehicle and implement employing an embodiment the present invention.
Figure 2:
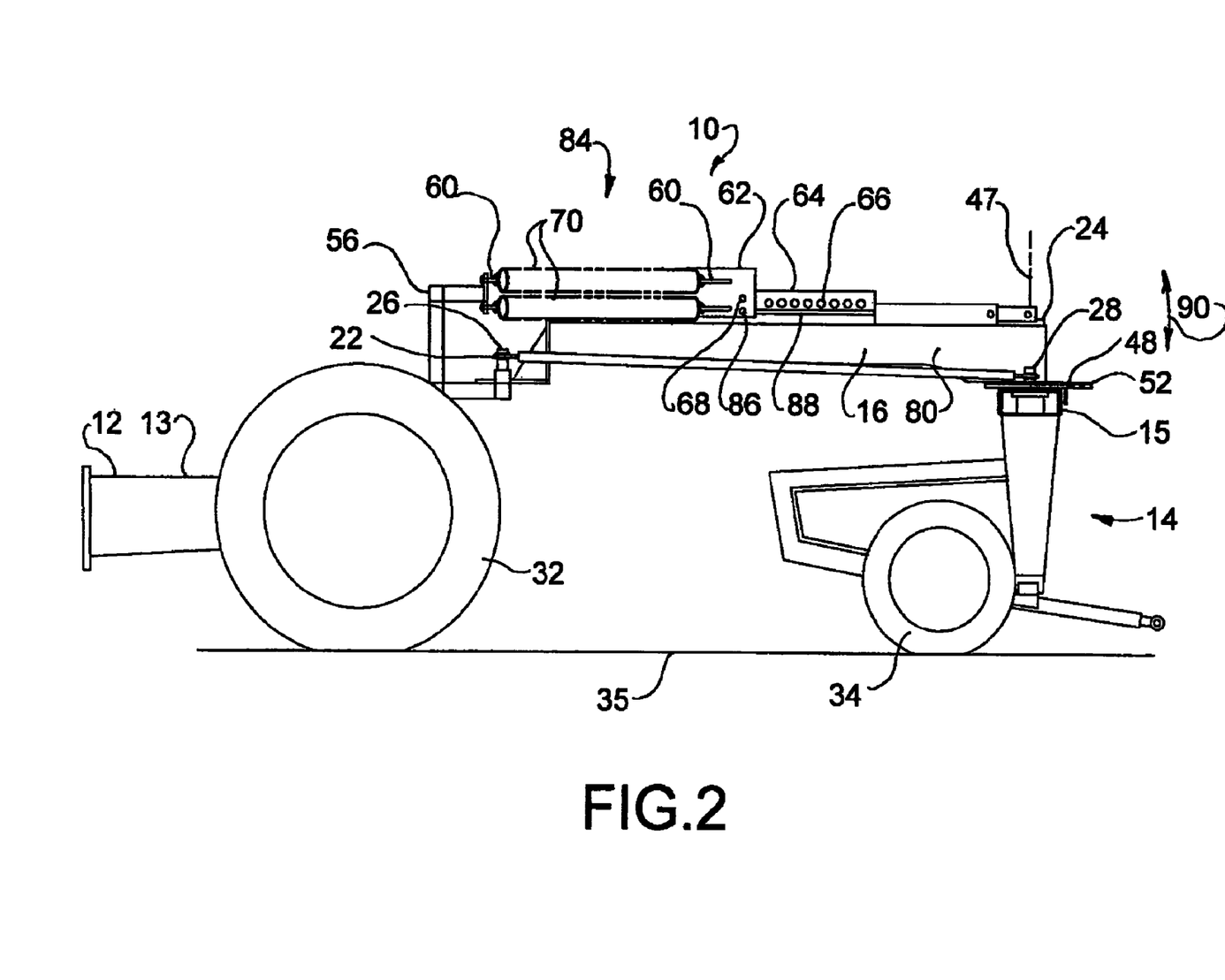
FIG. 2 is a side elevation view of FIG. 1.
Figure 3:
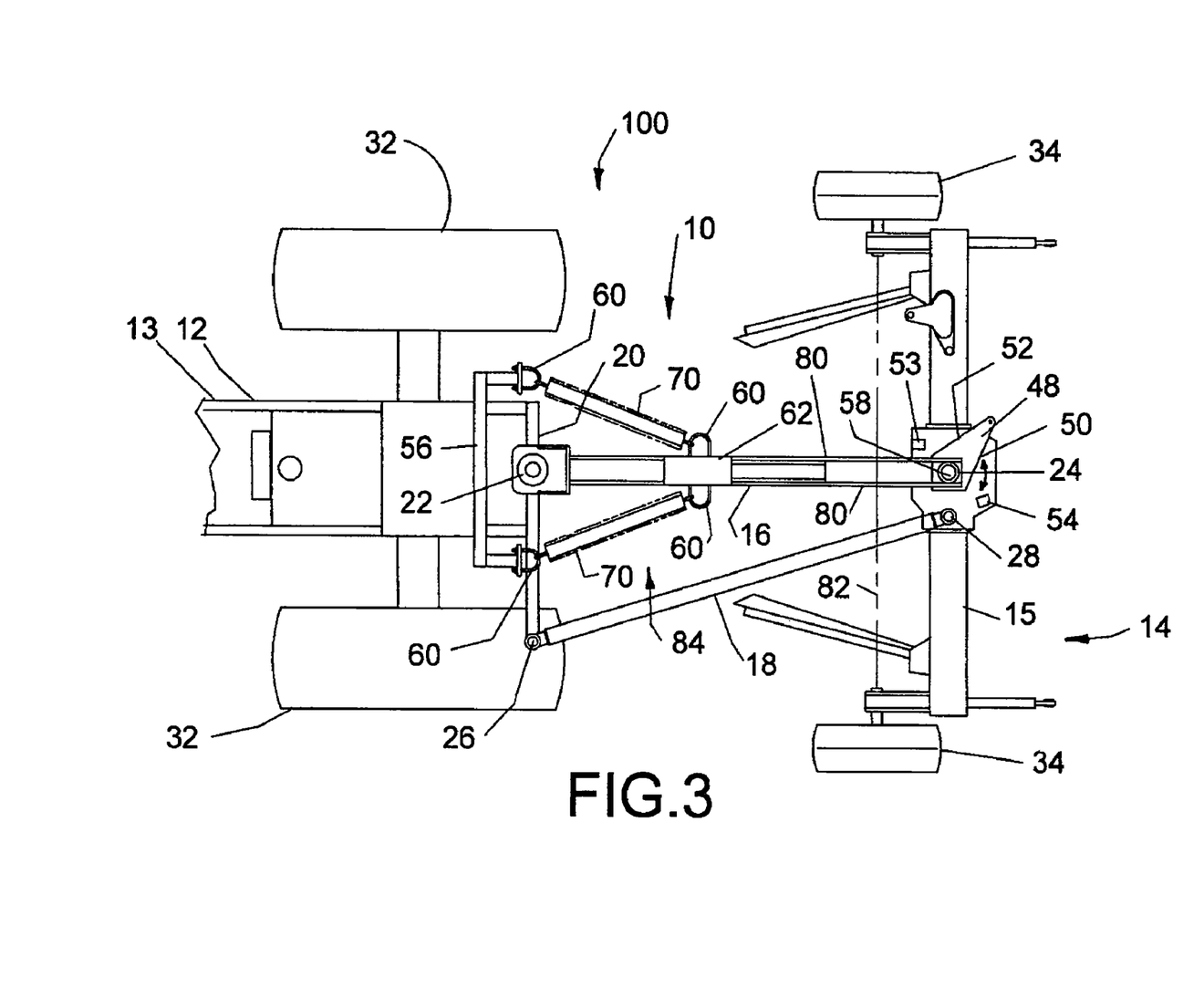
FIG. 3 is a plan view of FIG. 1.

Referring to the drawings for a description of a hitch or push-steering system which employs the present invention, FIGS. 1-3 show a frame 13 of a front portion 20 of a motorized vehicle or tractor 12 (schematically shown in FIG. 4) connected to a frame 15 of an implement 14 (schematically shown in FIG. 4) by a hitch or push-steering system 10. The implement 14 can be any implement, including but not limited to mowers, but can also be associated with tillage, seeding, cutting, harvesting, or any other type of operation capable of being performed by a unit pulled behind or push-steered by a motorized vehicle. In one embodiment, as shown schematically in FIG. 4, motorized vehicle or tractor 12, includes rear wheels 36 and front wheels 32. However, other arrangements of wheels 32, 36, such as duals or multiple wheels on each side of motorized vehicle can also be used.

As shown in FIGS. 1-5, push-steer system 10 includes a pair of links 16, 18 that connect implement 14 to front portion 20 of tractor 12. In one embodiment, front portion 20 includes a frame 56, although it is to be understood that links 16, 18 and other components associated with push-steer system 10 can be configured to directly connect with standard structural couplings provided on front portion 20. Connection 22 connects link 16 to frame 56 and connection 24 connects link 16 to implement 14. Similarly, connection 26 connects link 18 to frame 56 and connection 28 connects link 18 to implement 14. In one embodiment, connection 22 is capable of rotational movement, for example, three degrees of freedom, roll, pitch and yaw as understood by those skilled in the art, such as with a ball joint. As shown, connection 24 permits pivotal movement between implement 14 and link 16 about axis 47. That is, as shown in FIG. 1, a hinge pin 58 having a center axis 47 extending outwardly from implement 14 is received by link 16 such that relative movement between link 16 and implement 14 is achieved by implement 14 pivoting about axis 47. As further shown in FIG. 1, both connections 26, 28 between link 18 and frame 56 and implement 14, respectively, are capable of rotational movement having three degrees of freedom. Rotatable connections 22, 26 and 28 permit sufficient freedom of movement between links 16, 18 and corresponding frame 56 and implement 14 to account for changes in terrain. However, by virtue of pivotable connection 24 between link 16 and implement 14, implement 14 is prevented from "tipping", or uncontrolled pivoting about axis 82 (FIG. 3) which would otherwise occur due to the center of gravity of implement 14 not being coincident with axis 82 (FIG. 4) or operational use of implement 14.

In addition, the three rotational connections in conjunction with the two or more wheels on the implement allow the implement to adjust to terrain relative to the tractor.

It is to be understood that while links 16, 18 are shown and referred to as a pair, it is possible that additional links can be used to help guide the push-steer system of the present invention. Therefore, the phrase "pair of links" can include more than two links, so long as the kinematic operation of the primary two links, such as links 16, 18 connecting implement 14 and tractor 12 in a manner described in further detail below is not prevented.

As shown in FIGS. 1-3, push-steer system 10 incorporates a weight transfer system 84 from implement 14 to tractor 12. Weight transfer system 84 includes resilient devices or springs 70 that are connected between frame 56 and link 16 by rotatable linkages 60. In one embodiment, link 16 includes a collar 62 for connection with rotatable linkages 60. As shown, collar 62 is connectable to an adjustment fixture 64 including a plurality of spaced openings 66 formed in adjustment fixture 64 and a slot 88. Collar 62 includes a guide 86 that slidably engages slot 88 and further includes a selectably removable, or at least selectively retractable fastener 68 capable of engaging openings 66. In operation, after removing or retracting fastener 68, collar 62 is actuated in a direction away from frame 56, urging collar 62 to slidingly travel along slot 88 by virtue of the engagement between guide 86 and slot 88. Sufficient forces must be applied to collar 62 to overcome the spring constants of the springs 70, i.e., to elastically extend or stretch springs 70, to permit collar 62 movement. Alternately, the implement 14 needs to be rotated upward about rotatable connections 22 and 26 to shorten the spring 70 extension to reduce or eliminate the force associated with the springs.

The weight transfer system compensates for the center of gravity of the implement being in front of the implement wheels and causing a lifting force on the front wheels of the tractor. The adjustable weight transfer system allows the operator to distribute the weight between the implement wheels and tractor wheels to a desired ratio, such as 1:1, for stable operation.

Upon collar 62 reaching a desired position with respect to adjustment fixture 64, fastener 68, which was previously unengaged with opening 66, is then directed into engagement with both collar 62 and an aligned opening 66. In the engaged position, collar 62 is maintained in a fixed position with respect to frame 56. Extended or stretched springs 70 apply a retraction force between frame 56 and link 16 urging the end of link 16 adjacent connection 24 in rotational direction 90 (FIG. 2) away from driving surface 35. In other words, weight transfer system 84 acts to transfer weight from implement 14, reducing the amount of weight supported by implement wheels 34, and increasing the amount of weight supported by front wheels 32 of tractor 12. Additionally, the weight transfer system 84 acts to center push-steer system 10 as follows. When the tractor and implement are traveling straight ahead (FIGS. 3-4), link 16 extends forward of the tractor and perpendicular to frame 56 with springs 70 on the right side and on the left side being of equal length exerting substantially equal centering forces on each side of link 16. When the tractor and implement are negotiating a turn, such as a left hand turn shown in FIG. 5, link 16 is at an angle, not perpendicular to frame 56, causing the springs 70 on the left side (not shown in FIG. 5) to be extended more than the springs 70 on the right side, resulting in more force on the left side of link 16 than on the right hand side. This force assists in returning link 16 to the straight ahead or perpendicular to frame 56 position. This centering force aids in smoothly returning the push-steer system 10 to a stable straight ahead traveling position after the turn is completed.

In addition to being in connection with weight transfer system 84, link 16 is connected to implement 14 at connection 24 and which implement 14 pivots with respect to link 16 about axis 47. As shown in FIG. 1, an arm 48 is affixed to and extends outwardly from link 16 and is adjacent to connection 24, which arm 48 having opposed surfaces 50, 52. In one embodiment, upon assembly of link 16 to implement 14, frame 15 of implement 14 includes stops 53 and 54 (FIG. 3) disposed on opposite sides of arm 48. Stops 53 and 54 limit the amount of angular movement of pivotable connection 24 about axis 47. Contact between stops 53 and surface 52 of arm 48 represents the maximum angular position for a right hand turn of implement 14, while contact between stop 54 and surface 50 of arm 48 represents the maximum angular position for a left hand turn of implement 14.

Figure 5:
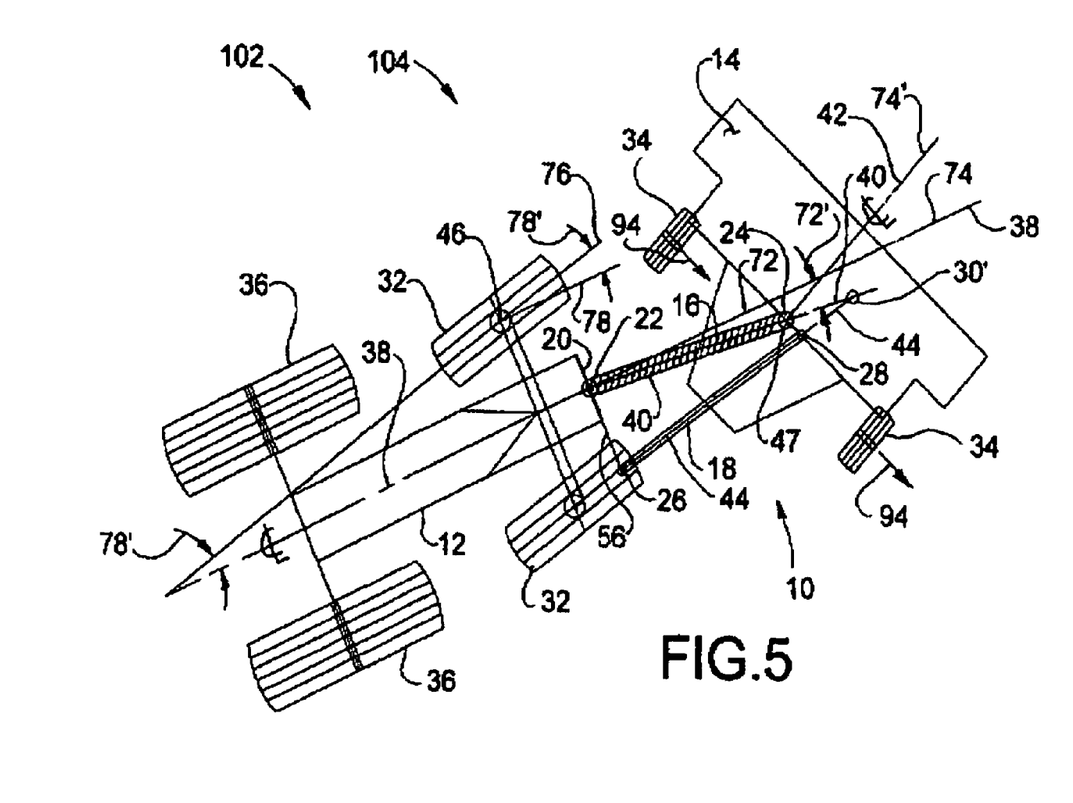
FIG. 5 is a plan view diagram showing a steered position of a front portion of a motorized vehicle and implement employing an embodiment the present invention.

Links 16, 18 of push-steering system 10, in combination with front portion 20 of tractor 12 and implement 14, form a four bar mechanism that is utilized to steer implement 14 in the same rotational direction that tractor 12 is being steered as shown in FIG. 5, which will be discussed in further detail below. In addition, push-steer system 10 provides a stable means to steer implement 14 in the same rotational direction, i.e., turning direction, as tractor 12 is being steered without requiring the tractor 12 to have a front end PTO or three point hitch, or specially designed implement frames, or implements that themselves must be specially designed.

Figure 4:
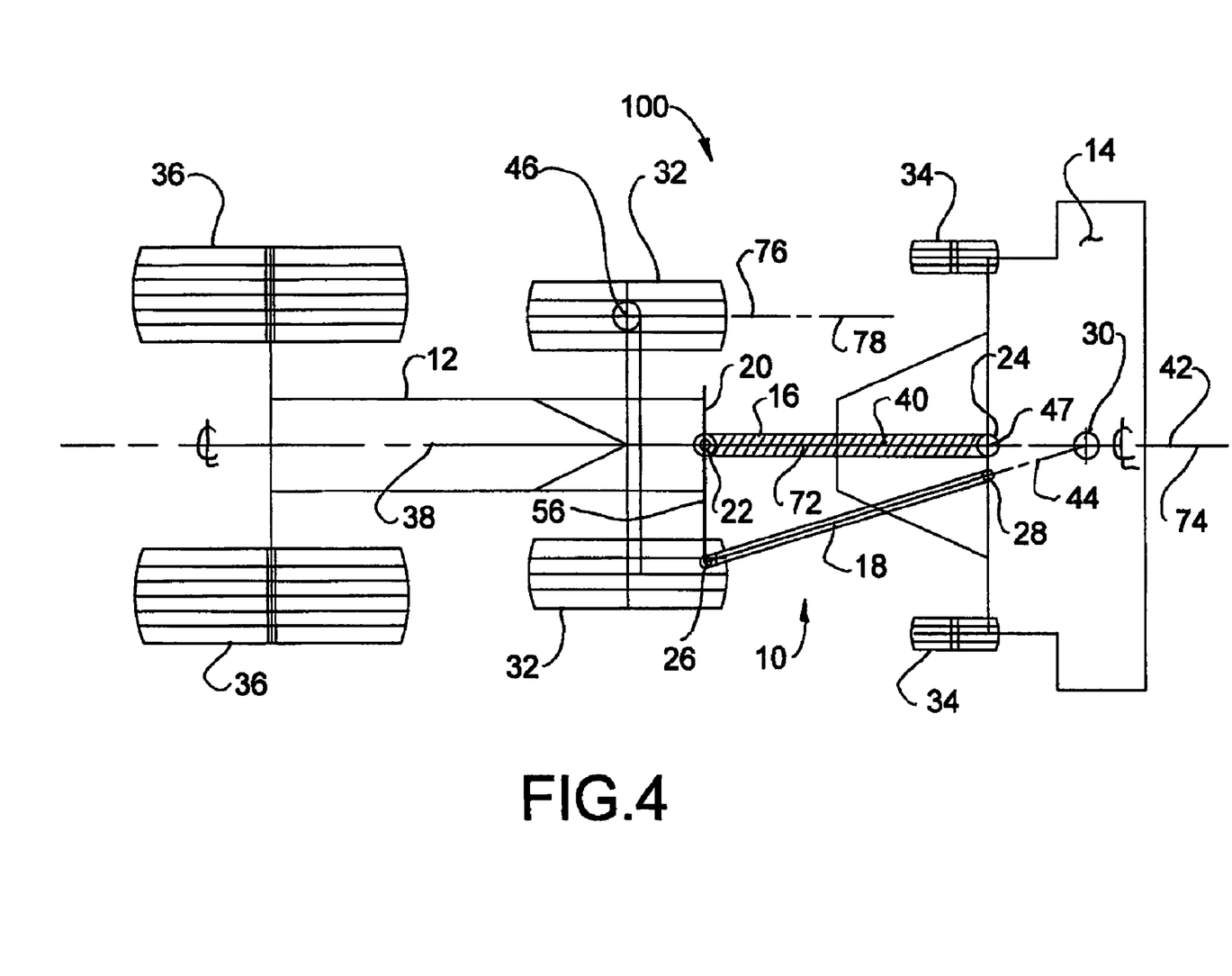
FIG. 4 is a plan view diagram showing a home position of a front portion of a motorized vehicle and implement employing an embodiment the present invention.
Figure 6:
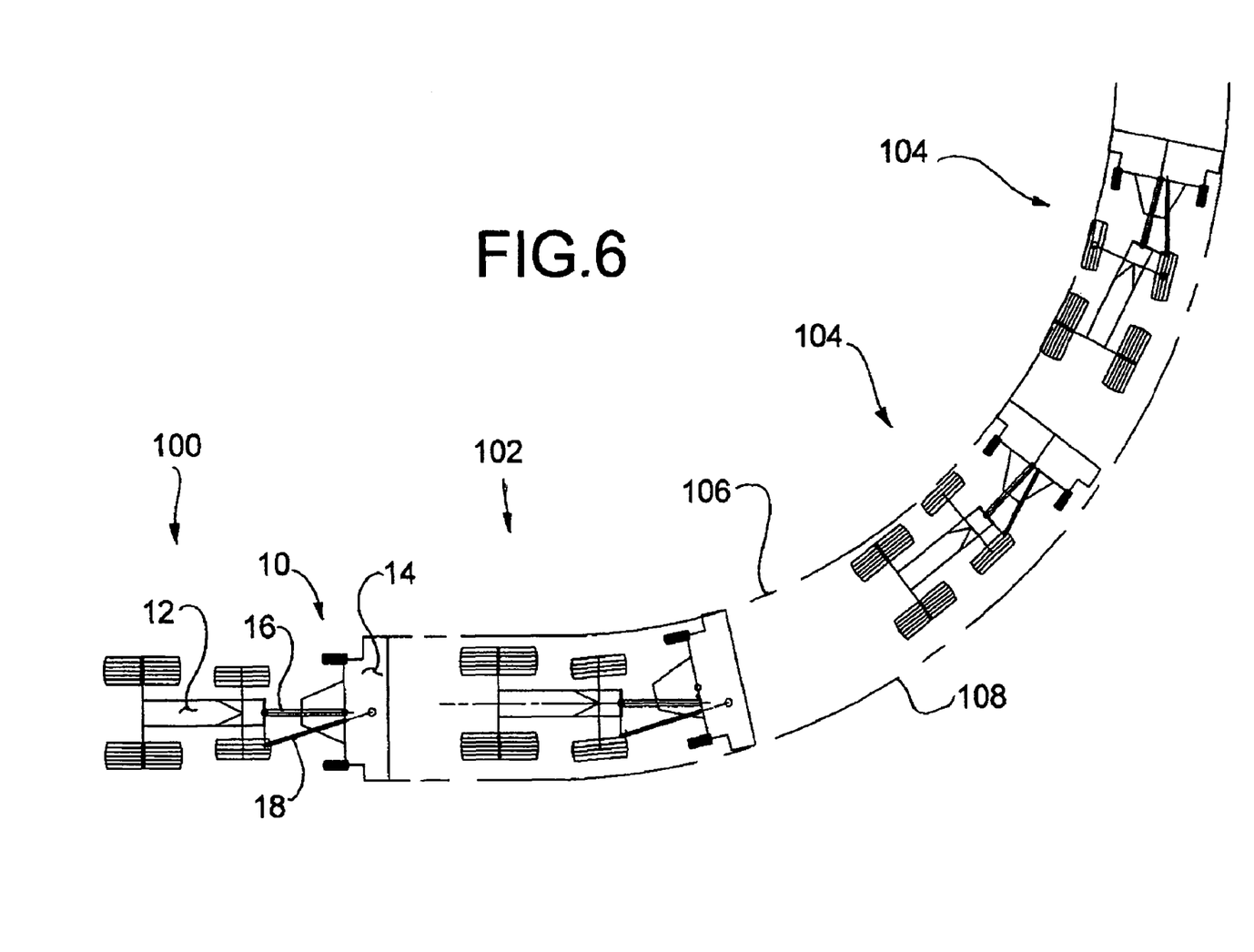
FIG. 6 is a plan view diagram showing a travel path traced by a home position transforming to a steered position of a front portion of a motorized vehicle and implement employing an embodiment the present invention.

As further schematically shown in FIGS. 4 and 5, tractor 12 includes a centerline axis 38 about which tractor 12 is symmetric. FIG. 4 shows a home position 100 for each of front wheels 32, push-steer steering system 10 and implement 14. For ease of drawing purposes and discussion, home position 100 corresponds to a mutual travel path for each of implement 14 and tractor 12 that is aligned with centerline axis 38. In other words, when tractor 12 and implement 14 are in home position 100, tractor 12 and implement 14 travel substantially in-line with centerline 38, or straight ahead. FIGS. 5 and 6 schematically show a transitional steering position 102 and a steered position 104 which are used to provide steering control of the tractor 12. For purposes of discussion, steering position 102 is intended to be a transitional angular position corresponding to a smaller angular measurement and which steering position 102 is increased in magnitude to achieve steered position 104. Steered position 104 corresponds to a larger angular measurement than steering position 102 that can be substantially continuously maintained to provide a substantially uniform edge 106 (FIG. 6) corresponding to the inner radius of the path defined by implement 14 and a substantially uniform edge 108 (FIG. 6) corresponding to the outer radius of the path defined by implement 14.

To provide basis for further orienting tractor 12 with respect to home position 100 and respective steering/steered positions 102, 104, FIG. 4 shows an axis 46 extending vertically from the center of one front wheel 32 installed on tractor 12. Wheel 32 pivots about axis 46 in response to the driver (not shown) turning the steering wheel (not shown). The other front wheel 32 contains a similar arrangement, pivots in a similar fashion and is not further discussed herein. A vertical plane 76 coincident with axis 46 bifurcates wheel 32 and is provided as an indicator of angular displacement or rotation from a reference position. As shown in FIG. 4 in home position 100, plane 76 is parallel to centerline axis 38. By virtue of plane 76 and centerline axis 38 being parallel, angular position 78, which is a reference angle position of wheel 32, is coincident with plane 76 and parallel to centerline axis 38 in home position 100.

In a similar fashion to orienting wheel 32 of tractor 12 with respect to home position 100, links 16, 18 of push-steer system 10 and implement 14 are also oriented in FIG. 4. Link 16 includes an axis 40 that extends from connection 22 to connection 24. In one embodiment, rotatable connection 22 between front portion 20 and link 16 and pivotable connection 24 between link 16 and implement 14 are each coincident with axis 38 of tractor 12. Therefore, in home position 100, axis 40 of link 16 and axis 38 of tractor 12 are coincident. Similarly, first angular position 72, which is a reference angle position of link 16 of the push-steer system, is the same as both centerline axis 38 and axis 40 in home position 100. Link 18 includes an axis 44 that extends from connection 26 to connection 28. That is, link 18 extends from rotatable connection 26 between front portion 20 and link 18 to rotatable connection 28 between link 18 and implement 14. Axes 40, 44 of respective links 16, 18 are non parallel to each other. Extending axes 40, 44 to intersection defines an instantaneous center 30, or the point about which implement 14 is pulled. The instantaneous center 30 (known to those skilled in the art) defines an axis about which the body is statically rotating and thus all kinematics are defined about that axis. This axis forward of the implement 14 acts as the steering rotational axis for the implement, as in a castor wheel, and along with the pair of links 16, 18 is the basis for the steering stability of the push steering system 10. Since axis 40 is coincident with axis 38, instantaneous center 30 is also coincident with axis 38 in home position 100.

It is to be understood that the portions of connections for link 16, 18 are fixed with respect to each other, i.e., connections 22, 24, 26, 28. Since the distance between connections 22, 26 is greater than the distance between connections 24, 28, links 16, 18 are maintained non parallel to each other at all times.

As further shown in FIG. 4, implement 14 is also oriented with respect to home position 100. In one embodiment, implement 14 has an axis 42 that is coincident with its centerline. As shown in FIG. 4, pivotable connection 24 between link 16 and implement 14 is coincident with the centerline of implement 14. In addition, in one embodiment, axis 42 of implement 14 is coincident with axis 38 of tractor 12. Therefore, second angular position 74, which is a reference angle position of implement 14 of the push-steer system, is the same as both centerline axis 38 and axis 42 in home position 100.

As shown in FIG. 5, steering/steered positions 102, 104 are now analyzed. As earlier discussed, the difference between steering/steered positions 102, 104 is a matter of magnitude, in that both steering/steered positions 102, 104 are determined in the same manner. Thus, only steered position 104 will be discussed. Steered position 104 is achieved in response to tractor 12 traveling at a steering angle 78', which is a measurement of the magnitude of angular travel of wheel 32 from angular position 78 pivoting about axis 46 toward plane 76 of wheel 32.

Also, as further shown in FIG. 5, in response to tractor 12 traveling at first steering angle 78', a traction element 94 is developed between wheels 34 of implement 14 and driving surface 35 (FIG. 2), which rotatably urges axis 40 of link 16 from first angular position 72 toward an offset angle 72'. Traction element 94 is a force applied by driving surface 35 (FIG. 2) to wheels 34 in a direction parallel to axis 82 (FIG. 3) of wheels 34, as further shown in FIG. 5. In one embodiment, wheels 34 rotate about axis 82, but are otherwise unable to move with respect to implement 14. In another embodiment, there may be more than two wheels instead of one wheel 34 in each position as shown in the figures, and further arrangements of wheels 34 are contemplated. It is possible, however, for the implement to have only one wheel. To do so the rotational joint 22 would need to be replaced by a universal joint (which transmits torque) so that the roll stability of the implement is controlled by the roll stability of the tractor 12. The push steer system 10 will still steer as long as the wheel is located behind the instantaneous center 30. As further shown in FIG. 5, for link 16 to achieve offset angle 72' from first angular position 72, link 16 pivots about a substantially vertical axis extending through connection 22 in a rotational direction opposite that of steering angle 78'. Stated another way, from the perspective of a tractor driver facing toward front portion 20 of tractor 12, steering angle 78' represents tractor 12 executing a left hand turn or steering the tractor 12 in a rotational direction toward a left hand turn. Similarly, from the tractor driver's perspective, movement toward offset angle 72' represents an end of link 16 adjacent to connection 24 pivoting about a substantially vertical axis extending through connection 22 toward link 18, i.e., to the right.

Additionally, in response to tractor 12 traveling at first steering angle 78' and the rotatable urging of link 16 from first angular position 72 in home position 100 toward offset angle 72', implement 14 is simultaneously rotatably urged to be steered toward a second steering angle 74' from second angular position 74 of implement 14 from home position 100. Second predetermined steering angle 74' is rotated in a rotational direction which is the same as that of the rotational direction of the first steering angle 78'. Stated another way, from the perspective of the tractor driver facing toward front portion 20 of tractor 12, steering angle 78' represents tractor 12 executing a left hand turn or steering the tractor 12 in a rotational direction toward a left hand turn. Similarly, from the tractor driver's perspective, steering angle 74' represents implement 14 executing a left hand turn or steering the implement 14 in a rotational direction toward a left hand turn.

The rotatable urging of implement 14 is due to the geometry of links 16, 18 of push-steering system 10, which in combination with front portion 20 of tractor 12 and implement 14, forms a four bar mechanism. The rotatable/pivotable connections 22, 24, 26, 28 between links 16, 18, as previously discussed, and front portion 20 and implement 14 provide for rotatably urging implement 14 toward predetermined second steering set angle 74' from second angular position 74 of implement 14 in response to a given rotational movement of link 16 rotated to offset angle 72' from first angular position 72 of link 16 from home position 100. As appreciated by those understanding kinematics, adjustments to the locations of connections 22, 24, 26, 28 can similarly change the relative magnitudes of offset angle 72' and 74' for a given steering angle 78'.

Importantly, for a range of first steering angle 78' of tractor 12, there exists corresponding second steering angle 74' of implement 14 that are in equilibrium with the corresponding traction force 94. In other words, if the magnitude of steering angle 78' were to be increased from that shown in FIG. 5, the magnitude of traction element 94 corresponding to steering angle 74' would increase, necessarily resulting in an increase in steering angle 74' to reach equilibrium with steering angle 78'. Stated another way, for each suitable steering angle 78' of tractor 12, push-steering system 10 brings about a corresponding stable second steering angle 74' for implement 14. However, for unsuitable first steering angles 74' 78' for the tractor, i.e., steering angles 78' exceeding a predetermined magnitude based on the combination of parameters, including, but not limited to, the size of links 16, 18, the weight distribution between wheels 34 of implement 14 and the front wheels 32 of tractor 12, degree of inflation of wheels 32, 34 tread design and relative extent of tread wear of wheels 32, 34, there is no corresponding second predetermined steering angle 74' for the implement. In such situations, implement 14 would attempt to increase steering angle 74' toward 90°, which would drive wheel 34 into either link 16, 18 or into tractor 12, possibly causing damage to these components. As appreciated by those skilled in operating implements hitched to a motorized vehicle, this condition is analogous to pulling an implement 14 behind tractor 12, placing the tractor 12 in reverse gear, and then applying and maintaining a maximum steering angle 78' when backing the implement 14. To restrict the magnitude of steering angles 74', arm 48 and stops 53 and 54 (FIG. 3) are provided, as previously discussed.

It is to be understood that while steering angle 78' for tractor 12 only depicts a left hand turn, push-steering system 10 can also be used for right hand turns. Thus, tractor 12 can drive along a path resembling an "S" or serpentine path. Moreover, while link 16 is shorter that link 18 as shown in the Figures, the push-steering system of the present invention exhibits minimal biasing with respect to left hand and right hand turns. That is, while turning response for the push-steering system is not identical in each turning direction, the differences based upon kinematic studies have been minimal.

It is possible to convert an implement 14 used in a pull behind configuration, where the implement has pin connection similar to connection 24. In one embodiment, after disconnecting a hydraulic cylinder (not shown), the link used to connect the tractor to the implement 14 in a pull behind configuration can be rotated 180 degrees, acting as link 16.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A system for push-steering an implement comprising:
   a pair of links, each link connecting the implement to a front portion of a motorized vehicle having a first longitudinal axis in a fore and aft direction of the vehicle, the implement having a second longitudinal axis in a fore and aft direction of the vehicle, and rotatably carrying at least two spaced wheels, wherein the front portion includes a frame, to which the pair of links are both rotatably mounted to permit arcuate movement of the links with respect to a horizontal plane and the links' connections to the frame;
   one of the links having a pivotable connection to the implement and rotatably connected to the front portion, the remaining link having rotatable connections between the front portion of the motorized vehicle and the implement, the pair of connected links between the motorized vehicle and the implement being non parallel to each other, wherein a weight transfer system connects the one link of the pair of links to the frame, the weight transfer system configured for selective adjustment for varying the distribution of weight of the implement between the wheels of the implement and the vehicle, and wherein the weight transfer system includes at least one resilient device connected between the frame and one of the links by a rotatable linkage, the resilient device configured to apply a retraction force between the frame and the one of the links for urging the end of that link away from a driving surface;
   in a home position, one link of the pair of links is disposed at a first angular position with respect to the first longitudinal axis and the second longitudinal axis is disposed at a second angular position with respect to the first longitudinal axis;
   an intersection of longitudinal extension lines from forward ends of the pair of links defining an instantaneous center forward of the front portion and between the at least two wheels;
   in response to the motorized vehicle traveling at a first predetermined steering angle with respect to the first longitudinal axis, causing the motorized vehicle and the implement to travel along a substantially arcuate path, a traction element developed between the at least two wheels of the implement and the driving surface rotatably urging the one link toward a predetermined offset angle from the first angular position in a rotational direction opposite of the first predetermined steering angle, the pair of links simultaneously rotatably urging the implement to be steered toward a second predetermined steering angle from the second angular position in the same rotational direction as the first predetermined steering angle,
   wherein the pair of links is configured to laterally displace the implement.

2. The system of claim 1 wherein the first longitudinal axis is substantially coincident with a centerline of the motorized vehicle.

3. The system of claim 1 wherein the second longitudinal axis is substantially coincident with a centerline of the implement.

4. The system of claim 1 wherein the instantaneous center is substantially coincident with a centerline of the motorized vehicle.

5. The system of claim 1 wherein an arm is affixed to the one link of the pair of links adjacent the rotatable connection between the one link and the implement, the arm disposed between a pair of stops affixed to the implement to limit angular travel of the implement with respect to the one link.

6. The system of claim 1 wherein one of the rotatable links includes a collar for connection with the rotatable linkage, the weight transfer system configured such that the least one resilient device is centered with respect to the home position, wherein the collar is adjustable along the one of the links for varying the distribution of weight of the implement between the wheel of the implement and the vehicle.

7. A system for push-steering an implement comprising:
   a pair of links, each link connecting the implement to a frame of a front portion of a motorized vehicle having a first axis in a fore and aft direction of the vehicle, the implement having a second axis in a fore and aft direction of the vehicle;
   one of the links having a pivotable connection to the implement and is mounted to the frame by a rotatable connection, the remaining link is rotatably mounted to the frame and has a second rotatable connection to the implement, the pair of connected links between the motorized vehicle and the implement being non parallel to each other, wherein the frame for connecting with the pair of links is connected to a weight transfer system, the weight transfer system connecting at least one link of the pair of links to the frame of the motorized vehicle, the weight transfer system configured for selective adjustment for varying the distribution of weight of the implement between the wheels of the implement and the vehicle, and wherein the weight transfer system includes at least one resilient device, the at least one resilient device connected between the frame and one of the links by a rotatable linkage, the resilient device configured to apply a retraction force between the frame and the one of the links for urging the end of that link adjacent the pivotal connection away from a driving surface;
   in a home position, one link of the pair of links is disposed at a first angular position with respect to the first axis and the second axis is disposed at a second angular position with respect to the first axis;
   an extension of the pair of links defines an instantaneous center forward of the front portion;
   in response to the motorized vehicle traveling at a first predetermined steering angle with respect to the first axis, causing the motorized vehicle and the implement to travel along a substantially arcuate path, a traction element developed between at least one wheel of the implement and the driving surface rotatably urging the one link toward a predetermined offset angle from the first angular position in a rotational direction opposite of the first predetermined steering angle, the pair of links simultaneously rotatably traveling along arcuate paths with respect to a horizontal plane and the frame and urging the implement to be steered toward a second predetermined steering angle from the second angular position in the same rotational direction as the first predetermined steering angle; and wherein the pair of links is configured to laterally displace the implement.

8. The system of claim 7 wherein the first axis is substantially coincident with a centerline of the motorized vehicle.

9. The system of claim 7 wherein the second axis is substantially coincident with a centerline of the implement.

10. The system of claim 7 wherein the instantaneous center is located forward of the wheels of the implement.

11. The system of claim 7 wherein an arm is affixed to the one link of the pair of links adjacent the rotatable connection between the one link and the implement, the arm disposed between a pair of stops affixed to the implement to limit angular travel of the implement with respect to the one link.

12. The system of claim 7 wherein one of the rotatable links including a collar for connection with the rotatable linkage, and configured such that the at least one resilient device is centered with respect to the home position, wherein the collar is adjustable along the one of the links for varying the force applied to that link by the at least one resilient device.

13. A method for constructing a push-steering system for an implement comprising:

providing a pair of links; connecting each link to an implement;

connecting each link to a front portion of a motorized vehicle having a first axis, in a fore and aft direction, the pair of connected links between the motorized vehicle and the implement being non parallel to each other, the implement having a second axis in a fore and aft direction and rotatably carrying at least two spaced wheels;

connecting a weight transfer system between the one link of the pair of links and the front portion, the weight transfer system adjustably configured for selective adjustment for varying the distribution of weight of the implement between the wheels of the implement and the vehicle, wherein the weight transfer system includes at least one resilient device, the at least one resilient device connected between the frame and one of the links by a rotatable linkage, the resilient device configured to apply a retraction force between frame and the one of the links for urging the end of that link adjacent the pivotal connection away from a driving surface, one of the links having pivotable connection to the implement and rotatably connected to the front portion, the remaining link having rotatable connections between the front portion of the motorized vehicle and the implement, in a home position, one link of the pair of links disposed at a first angular position with respect to the first axis and the second axis is disposed at a second angular position with respect to the first axis, an intersection of longitudinal extension lines form forward ends of pair of links defining an instantaneous center forward of the front portion and between the at least two wheels, in response to the motorized vehicle traveling at a first predetermined steering angle with respect to the first axis, causing the motorized vehicle and the implement to travel along a substantially arcuate path, a traction element developed between the at least two wheels of the implement and the driving surface rotatably urging the one link toward a predetermined offset angle from the first angular position in a rotational direction opposite of the first predetermined steering angle, and the pair of links simultaneously rotatably urging the implement to be steered toward a second predetermined steering angle from the second angular position in the same rotational direction as the first predetermined steering angle, the pair of links configured to laterally displace the implement and pivotable connection between the one of the links and the implement, with respect to the first axis, as the implement is steered toward the second predetermined angle.

* * * * *